US012675448B2

(12) United States Patent
Pore et al.

(10) Patent No.: US 12,675,448 B2
(45) Date of Patent: Jul. 7, 2026

(54) METHOD AND SYSTEM FOR LINKING DATA EVENTS AND STREAMS

(71) Applicant: JPMorgan Chase Bank, N.A., New York, NY (US)

(72) Inventors: Akshay Pore, Phoenix, AZ (US); Piyoosh Bhargav, Phoenix, AZ (US); Andrew Jennings, New York, NY (US); Matthew Rawlings, Croton on Hudson, NY (US); Dharmesh Chavda, Frisco, TX (US); Elhadi Elhadi, Dallas, TX (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 271 days.

(21) Appl. No.: 18/431,031

(22) Filed: Feb. 2, 2024

(65) Prior Publication Data

US 2025/0252086 A1      Aug. 7, 2025

(51) Int. Cl.
| | |
|---|---|
| *G06F 16/21* | (2019.01) |
| *G06F 16/2455* | (2019.01) |
| *G06F 16/25* | (2019.01) |

(52) U.S. Cl.
CPC ...... *G06F 16/212* (2019.01); *G06F 16/24568* (2019.01); *G06F 16/258* (2019.01)

(58) Field of Classification Search
CPC . G06F 16/212; G06F 16/24568; G06F 16/258
See application file for complete search history.

(56) References Cited

U.S. PATENT DOCUMENTS

| | | | |
|---|---|---|---|
| 2018/0276304 A1* | 9/2018 | Peled | G06F 16/958 |
| 2020/0314211 A1* | 10/2020 | Oye | H04L 63/062 |
| 2021/0097231 A1* | 4/2021 | Downs | G06F 40/137 |
| 2025/0131031 A1* | 4/2025 | Portisch | G06F 16/9024 |

* cited by examiner

*Primary Examiner* — Apu M Mofiz
*Assistant Examiner* — Husam Turki Samara
(74) *Attorney, Agent, or Firm* — GREENBLUM & BERNSTEIN, P.L.C.

(57) ABSTRACT

Methods and systems for generating, publishing, processing, and consuming linked data events and streams being shared by complex systems in order to construct a semantic web of the data and thereby form a consolidated coherent view of the data are provided. A method includes: receiving a set of metadata that relates to a set of events; generating, based on the metadata, an ordered node hierarchy map and a modern data event schema; receiving a set of tabular data; generating, based on the tabular data and the ordered node hierarchy map, the set of events; streaming the set of events over a streaming pipeline; processing the streamed set of events to generate a linked data media format; and outputting the linked data media format.

15 Claims, 7 Drawing Sheets

400

400

600

700

800

METHOD AND SYSTEM FOR LINKING DATA EVENTS AND STREAMS

BACKGROUND

1. Field of the Disclosure

This technology generally relates to methods and systems for linking data events and streams, and more particularly, to methods and systems for generating, publishing, processing, and consuming linked data events and streams being shared by complex systems in order to construct a semantic web of the data and thereby form a consolidated coherent view of the data.

2. Background Information

Linked data refers to a set of principles and best practices for publishing, sharing, and linking structured data on the semantic web. Linked data and the semantic web aim to make data more interconnected and accessible, enabling machines and humans to discover, browse, and understand data across various sources.

Apache Avro, a data serialization framework, provides efficient data interchange in a compact binary format and is often used in big data processing frameworks such as Apache Hadoop and Apache Kafka due to its efficiency, flexibility, and compatibility features. However, Avro does not natively support linked data.

JavaScript Object Notation (JSON) is an open standard format for creating and storing files or exchanging data that uses comprehensible and human-readable text made up of attributes and serializable values. JSON is relatively easy for humans to read and write and for machines to parse and generate.

JSON—Linked Data (JSON-LD) is a lightweight extension of JSON and retains JSON's human-readable and familiar syntax, thereby making it accessible to both human and machines. JSON-LD provides a way to add context and semantic meaning to JSON data, allowing it to be part of the linked data ecosystem.

Comma-separated values (CSV) on the web (CSVW) is a standard that is used to describe the contents and structure of tabular data on the web. CSVW allows publishers to add metadata to describe the contents and structure of CSV files, including column headers, data types, and other information. By providing standardized vocabularies to describe the structure, CSVW can help improve data interoperability and facilitate data sharing and reuse.

Data streaming refers to continuous and real-time transfer of data from one source to another in a steady flow, allowing for the immediate processing, analysis, or consumption of the data as it is generated or received enabling immediate insights and proactive decision-making.

An event-driven architecture (EDA) may be employed to stream data events, i.e., event streaming, and focuses on the production and detection of events to drive application logic and communication between loosely coupled components. In an EDA system, events represent occurrences or significant changes in the state of the system, triggering reactions or updates in other components. This approach promotes asynchronous, distributed, and scalable applications that can handle continuous data streams and respond to real-time changes.

Data streaming and EDA play crucial roles in modern data processing and application development. Data streaming provides continuous flow of data, while EDA utilizes events to trigger actions based on this data. Together they form the foundation for building reactive and responsive applications that can adapt to real-time changes.

Recently, data streaming has become the standard for complex systems to share data in real time, enabling them to make business decisions quickly. However, when multiple complex systems share data at a high velocity, the consumer of the data is not able to link the different data streams together to form a consolidated coherent view of the data due to lack of semantic meaning behind the data received. Accordingly, there is a need for a mechanism that would solve this problem by generating, publishing, processing, and consuming linked data events and streams being shared by complex systems in order to construct a semantic web of the data and thereby form a consolidated coherent view of the data.

SUMMARY

The present disclosure, through one or more of its various aspects, embodiments, and/or specific features or sub-components, provides, inter alia, various systems, servers, devices, methods, media, programs, and platforms for generating, publishing, processing, and consuming linked data events and streams being shared by complex systems in order to construct a semantic web of the data and thereby form a consolidated coherent view of the data.

According to an aspect of the present disclosure, a method for generating a set of linked data events is provided. The method is implemented by at least one processor. The method includes: receiving, by the at least one processor, a first set of metadata that relates to a first set of events; generating, by the at least one processor based on the first set of metadata, an ordered node hierarchy map and a modern data event schema; receiving, by the at least one processor, a first set of tabular data; generating, by the at least one processor based on the first set of tabular data and the ordered node hierarchy map, the first set of events; streaming the first set of events over a streaming pipeline; processing the streamed first set of events to generate at least one linked data media format; and outputting the at least one linked data media format.

The first set of metadata may use a comma-separated values for the web (CSVW) standard that describes a content and a structure of the first set of tabular data.

The ordered node hierarchy map may include information that relates to columns of tables associated with the structure of the first set of tabular data as specified in the first set of metadata according to the CSVW standard, including a first column annotation that relates to an "about" uniform resource locator (URL) identifier, a second column annotation that relates to a "property" URL identifier, a third column annotation that relates to a "value" URL identifier, a fourth column annotation that relates to a column name, a fifth column annotation that relates to a data type, a sixth column annotation that relates to a textual description, a seventh column annotation that relates to an indication as to whether cells in a column are permitted to be empty, and an eighth column annotation that relates to a title.

The generating of the ordered node hierarchy map may include: resolving annotations included in the first set of metadata; retrieving and associating attributes with the columns; generating a set of nodes that correspond to respective combinations of domain class, domain, range, property, and datatype; generating a node order based on node levels with respect to a root node; and using the set of nodes and the node order to generate a nested hierarchical JavaScript Object Notation (JSON) structure having a semantic event schema format.

The generating of the modern data event schema may include: receiving a first user input; identifying, based on the first user input, a set of target state schema specifications; and using the ordered node hierarchy map and the set of target state schema specifications to map data types associated with the first set of metadata into the modern data event schema.

The generating of the first set of events may include: ingesting the first set of tabular data; transforming the ingested data based on the set of target state schema specifications; iterating the transformed data over the ordered node hierarchy map to build a semantic event payload; and serializing the semantic event payload.

The processing of the streamed set of events to generate at least one linked data media format may include: deserializing the streamed first set of events; removing null objects from the streamed first set of events; constructing a semantic context that provides a mapping between terms used in the streamed first set of events and corresponding definitions; and generating the at least one linked data media format by combining the semantic context with each respective event included in the streamed first set of events.

The method may further include receiving a second user input that specifies a media type. The generating of the at least one linked data media format may include combining the semantic context with each respective event based on the specified media type.

The outputting of the at least one linked data media format may include storing the at least one linked data media format in a database that is accessible for performing at least one from among a data analytics operation, a graph data mining operation, a machine learning operation, and a generative artificial intelligence operation.

According to another aspect of the present disclosure, a computing apparatus for generating a set of linked data events is provided. The computing apparatus includes a processor, a memory, and a communication interface coupled to each of the processor and the memory. The processor is configured to: receive, via the communication interface, a first set of metadata that relates to a first set of events; generate, based on the first set of metadata, an ordered node hierarchy map and a modern data event schema; receive, via the communication interface, a first set of tabular data; generate, based on the first set of tabular data and the ordered node hierarchy map, the first set of events; stream the first set of events over a streaming pipeline; process the streamed first set of events to generate at least one linked data media format; and output the at least one linked data media format.

The first set of metadata may use a comma-separated values for the web (CSVW) standard that describes a content and a structure of the first set of tabular data.

The ordered node hierarchy map may include information that relates to columns of tables associated with the structure of the first set of tabular data as specified in the first set of metadata according to the CSVW standard, including a first column annotation that relates to an "about" uniform resource locator (URL) identifier, a second column annotation that relates to a "property" URL identifier, a third column annotation that relates to a "value" URL identifier, a fourth column annotation that relates to a column name, a fifth column annotation that relates to a data type, a sixth column annotation that relates to a textual description, a seventh column annotation that relates to an indication as to whether cells in a column are permitted to be empty, and an eighth column annotation that relates to a title.

The processor may be further configured to generate the ordered node hierarchy map by: resolving annotations included in the first set of metadata; retrieving and associating attributes with the columns; generating a set of nodes that correspond to respective combinations of domain class, domain, range, property, and datatype; generating a node order based on node levels with respect to a root node; and using the set of nodes and the node order to generate a nested hierarchical JavaScript Object Notation (JSON) structure having a semantic event schema format.

The processor may be further configured to generate the modern data event schema by: receiving a first user input; identifying, based on the first user input, a set of target state schema specifications; and using the ordered node hierarchy map and the set of target state schema specifications to map data types associated with the first set of metadata into the modern data event schema.

The processor may be further configured to generate the first set of events by: ingesting the first set of tabular data; transforming the ingested data based on the set of target state schema specifications; iterating the transformed data over the ordered node hierarchy map to build a semantic event payload; and serializing the semantic event payload.

The processor may be further configured to process the streamed set of events to generate at least one linked data media format by: deserializing the streamed first set of events; removing null objects from the streamed first set of events; constructing a semantic context that provides a mapping between terms used in the streamed first set of events and corresponding definitions; and generating the at least one linked data media format by combining the semantic context with each respective event included in the streamed first set of events.

The processor may be further configured to receive a second user input that specifies a media type, and to generate the at least one linked data media format by combining the semantic context with each respective event based on the specified media type.

The processor may be further configured to output the at least one linked data media format by storing the linked data media format in a database that is accessible for performing at least one from among a data analytics operation, a graph data mining operation, a machine learning operation, and a generative artificial intelligence operation.

According to another exemplary embodiment, a non-transitory computer readable storage medium storing instructions for generating a set of linked data events is provided. The storage medium includes executable code which, when executed by a processor, causes the processor to: receive a first set of metadata that relates to a first set of events; generate, based on the first set of metadata, an ordered node hierarchy map and a modern data event schema; receive a first set of tabular data; generate, based on the first set of tabular data and the ordered node hierarchy map, the first set of events; stream the first set of events over a streaming pipeline; process the streamed first set of events to generate at least one linked data media format; and output the at least one linked data media format.

The first set of metadata may use a comma-separated values for the web (CSVW) standard that describes a content and a structure of the first set of tabular data.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
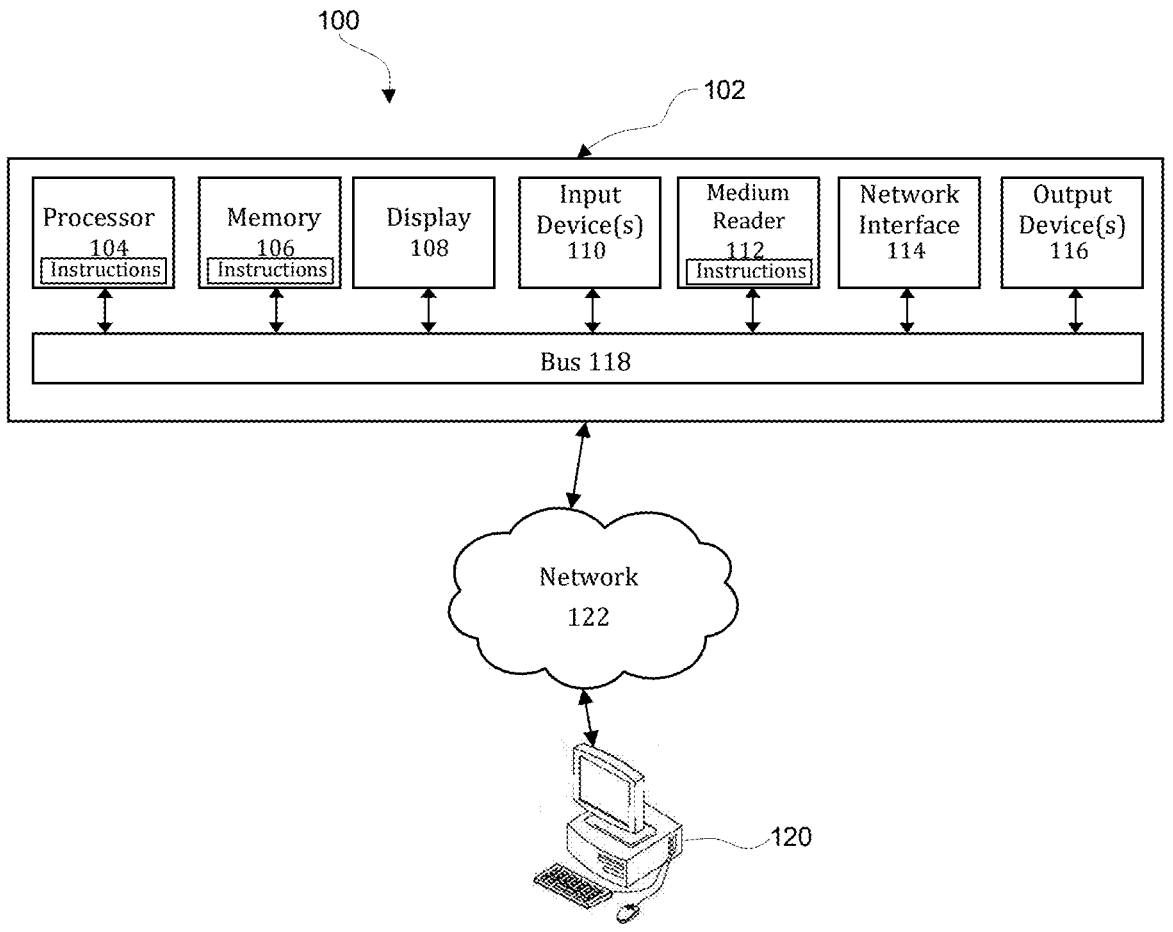
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infra-red, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

As described herein, various embodiments provide optimized methods and systems for generating, publishing, processing, and consuming linked data events and streams being shared by complex systems in order to construct a semantic web of the data and thereby form a consolidated coherent view of the data.

Figure 2:
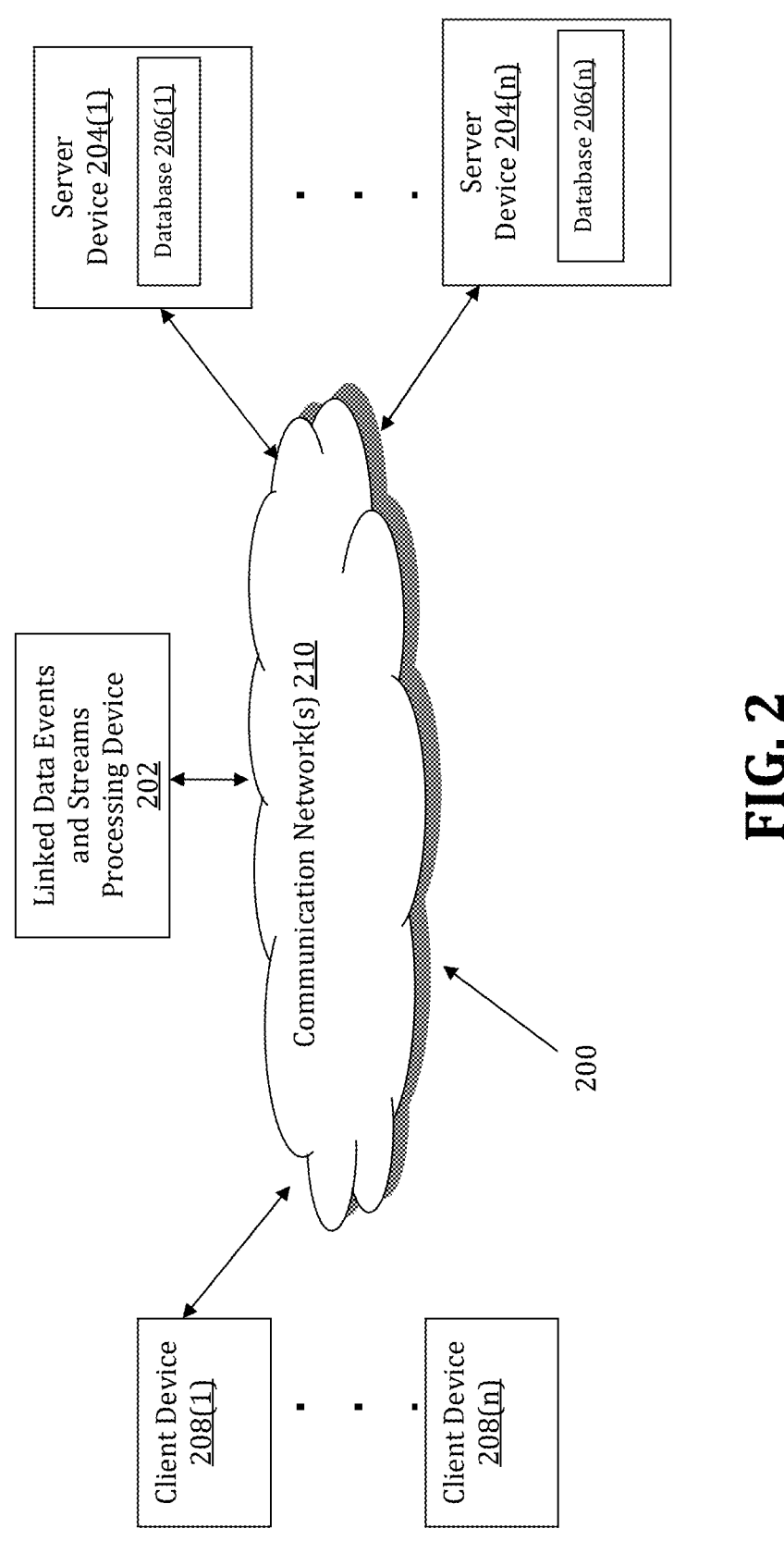
FIG. 2 illustrates an exemplary diagram of a network environment.

Referring to FIG. 2, a schematic of an exemplary network environment 200 for implementing a method for generating, publishing, processing, and consuming linked data events and streams being shared by complex systems in order to construct a semantic web of the data and thereby form a consolidated coherent view of the data is illustrated. In an exemplary embodiment, the method is executable on any networked computer platform, such as, for example, a personal computer (PC).

The method for generating, publishing, processing, and consuming linked data events and streams being shared by complex systems in order to construct a semantic web of the data and thereby form a consolidated coherent view of the data may be implemented by a Linked Data Events and Streams Processing (LDESP) device 202. The LDESP device 202 may be the same or similar to the computer system 102 as described with respect to FIG. 1. The LDESP device 202 may store one or more applications that can include executable instructions that, when executed by the LDESP device 202, cause the LDESP device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. The cloud-based computing environment may be hosted on third party hardware or on premise, or some combination thereof. Multiple third parties may also provide the virtual machines. Also, the application(s), and even the LDESP device 202 itself, may be located in virtual server(s) running in a cloud-based computing environment rather than being tied to one or more specific physical network computing devices. Also, the application(s) may be running in one or more virtual machines (VMs) executing on the LDESP device 202. Additionally, in one or more embodiments of this technology, virtual machine(s) running on the LDESP device 202 may be managed or supervised by a hypervisor.

In the network environment 200 of FIG. 2, the LDESP device 202 is coupled to a plurality of server devices 204(1)-204(n) that hosts a plurality of databases 206(1)-206(n), and also to a plurality of client devices 208(1)-208(n) via communication network(s) 210. A communication interface of the LDESP device 202, such as the network interface 114 of the computer system 102 of FIG. 1, operatively couples and communicates between the LDESP device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the LDESP device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and LDESP devices that efficiently implement a method for generating, publishing, processing, and consuming linked data events and streams being shared by complex systems in order to construct a semantic web of the data and thereby form a consolidated coherent view of the data.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The LDESP device 202 may be a standalone device or integrated with one or more other devices or apparatuses, such as one or more of the server devices 204(1)-204(n), for example. In one particular example, the LDESP device 202 may include or be hosted by one of the server devices 204(1)-204(n), and other arrangements are also possible. Moreover, one or more of the devices of the LDESP device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the LDESP device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store various types of information.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208 (1)-208(*n*) in this example may include any type of computing device that can interact with the LDESP device 202 via communication network(s) 210. Accordingly, the client devices 208(1)-208(*n*) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(*n*) may run interface applications, such as standard web browsers or standalone client applications, which may provide an interface to communicate with the LDESP device 202 via the communication network(s) 210 in order to communicate user requests and information. The client devices 208(1)-208(*n*) may further include, among other features, a display device, such as a display screen or touchscreen, and/or an input device, such as a keyboard, for example.

Although the exemplary network environment 200 with the LDESP device 202, the server devices 204(1)-204(*n*), the client devices 208(1)-208(*n*), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the LDESP device 202, the server devices 204(1)-204(*n*), or the client devices 208(1)-208(*n*), for example, may be configured to operate as virtual instances on the same physical machine. In other words, one or more of the LDESP device 202, the server devices 204(1)-204(*n*), or the client devices 208(1)-208(*n*) may operate on the same physical device rather than as separate devices communicating through communication network(s) 210. Additionally, there may be more or fewer LDESP devices 202, server devices 204(1)-204(*n*), or client devices 208(1)-208(*n*) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
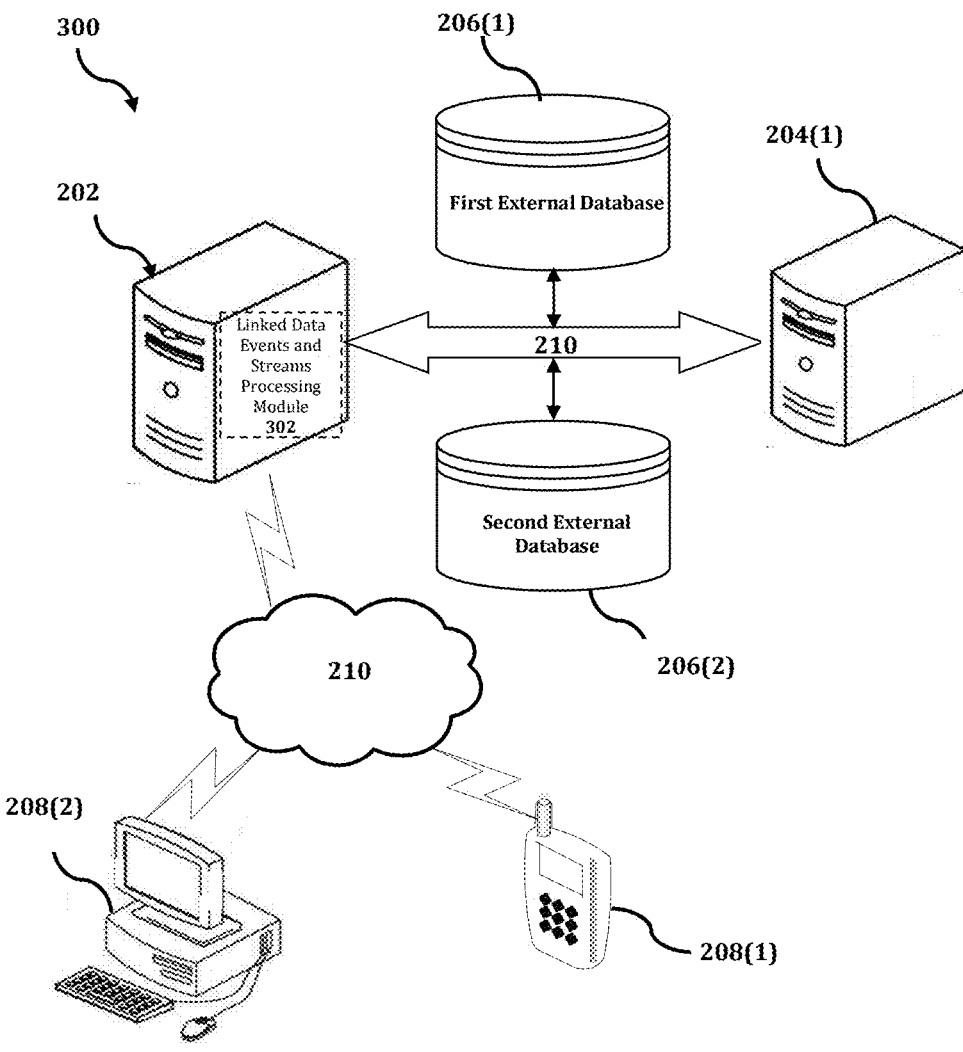
FIG. 3 shows an exemplary system for implementing a method for generating, publishing, processing, and consuming linked data events and streams being shared by complex systems in order to construct a semantic web of the data and thereby form a consolidated coherent view of the data.

The LDESP device 202 is described and shown in FIG. 3 as including a linked data events and streams processing module 302, although it may include other rules, policies, modules, databases, or applications, for example. As will be described below, the linked data events and streams processing module 302 is configured to implement a method for generating, publishing, processing, and consuming linked data events and streams being shared by complex systems in order to construct a semantic web of the data and thereby form a consolidated coherent view of the data in an automated, efficient, scalable, and reliable manner.

An exemplary process 300 for implementing a method for generating, publishing, processing, and consuming linked data events and streams being shared by complex systems in order to construct a semantic web of the data and thereby form a consolidated coherent view of the data by utilizing the network environment of FIG. 2 is shown as being executed in FIG. 3. Specifically, a first client device 208(1) and a second client device 208(2) are illustrated as being in communication with LDESP device 202. In this regard, the first client device 208(1) and the second client device 208(2) may be "clients" of the LDESP device 202 and are described herein as such. Nevertheless, it is to be known and understood that the first client device 208(1) and/or the second client device 208(2) need not necessarily be "clients" of the LDESP device 202, or any entity described in association therewith herein. Any additional or alternative relationship may exist between either or both of the first client device 208(1) and the second client device 208(2) and the LDESP device 202, or no relationship may exist.

Further, LDESP device 202 is illustrated as being able to access a first external database 206(1) and a second external database 206(2). The linked data events and streams processing module 302 may be configured to access these databases for implementing a method for generating, publishing, processing, and consuming linked data events and streams being shared by complex systems in order to construct a semantic web of the data and thereby form a consolidated coherent view of the data.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the LDESP device 202 via broadband or cellular communication. Of course, these embodiments are merely exemplary and are not limiting or exhaustive.

Upon being started, the linked data events and streams processing module 302 executes a process for generating, publishing, processing, and consuming linked data events and streams being shared by complex systems in order to construct a semantic web of the data and thereby form a consolidated coherent view of the data. An exemplary process for generating, publishing, processing, and consuming linked data events and streams being shared by complex systems in order to construct a semantic web of the data and thereby form a consolidated coherent view of the data is generally indicated at flowchart 400 in FIG. 4.

Figure 4:
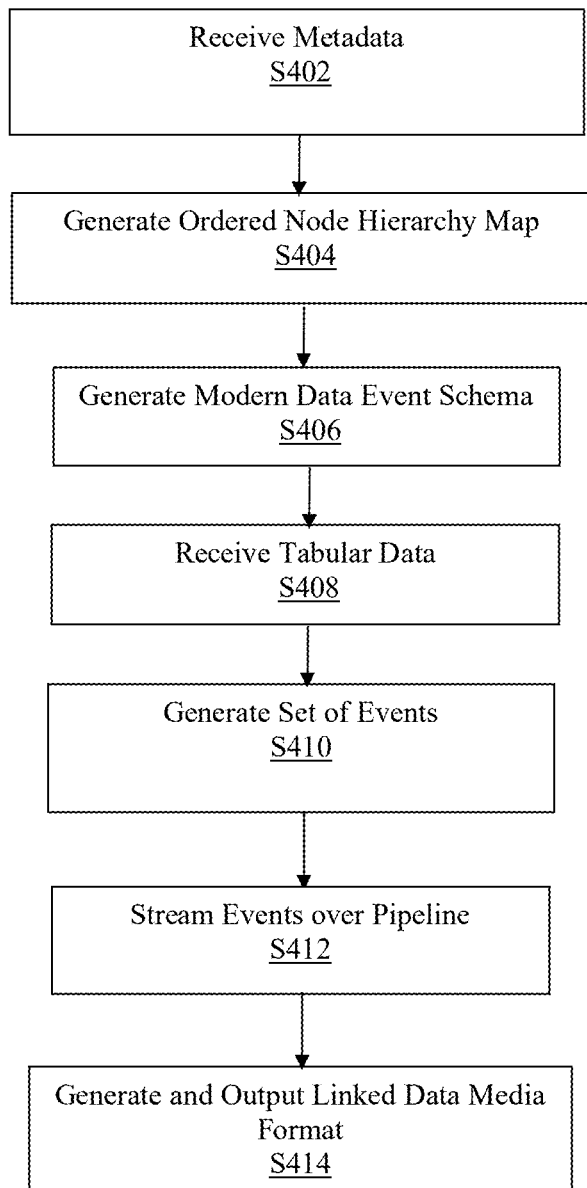
FIG. 4 is a flowchart of an exemplary process for implementing a method for generating, publishing, processing, and consuming linked data events and streams being shared by complex systems in order to construct a semantic web of the data and thereby form a consolidated coherent view of the data.

In the process 400 of FIG. 4, at step S402, the linked data events and streams processing module 302 receives a set of metadata that relates to a set of events. In an exemplary embodiment, the metadata uses a comma-separated values (CSV) for the web (CSVW) standard that describes a content and structure of tabular data with which the metadata is associated.

At step S404, the linked data events and streams processing module 302 uses the metadata received in step S402 to generate an ordered node hierarchy map. In an exemplary embodiment, the ordered node hierarchy map includes information that relates to columns of tables associated with the same tabular data with which the CSVW metadata is associated. For example, the ordered node hierarchy map may include information about any one or more of the following: a first column annotation that relates to an "about" uniform resource locator (URL) identifier, a second column annotation that relates to a "property" URL identifier, a third column annotation that relates to a "value" URL identifier, a fourth column annotation that relates to a column name, a fifth column annotation that relates to a data type, a sixth column annotation that relates to a textual description, a seventh column annotation that relates to an indication as to whether cells in a column are permitted to be empty, and/or an eighth column annotation that relates to a title.

In an exemplary embodiment, the generating of the ordered node hierarchy map may be implemented by performing the following operations: resolving annotations included in the metadata; retrieving and associating attributes with the columns of the tables; generating a set of nodes that correspond to respective combinations of domain class, domain, range, property, and datatype; generating a node order based on node levels with respect to a root node; and using the set of nodes and the node order to generate a nested hierarchical JavaScript Object Notation (JSON) structure having a semantic event schema format.

At step S406, the linked data events and streams processing module 302 uses the metadata received in step S402 to generate a modern data event schema. In an exemplary embodiment, the generating of the modern data event schema may be implemented by performing the following operations: receiving a user input that includes information relating to a set of target state schema specifications; identifying the target state schema specifications; and using the ordered node hierarchy map and the set of target state schema specifications to map data types associated with the metadata into the modern data event schema.

At step S408, the linked data events and streams processing module 302 receives a set of tabular data that has a content and structure that is reflective of the metadata. Then, at step S410, the linked data events and streams processing module 302 uses the tabular data and the ordered node hierarchy map to generate a set of events. In an exemplary embodiment, the generating of the set of events may be implemented by performing the following operations: ingesting the tabular data received in step S408; transforming the ingested data based on the set of target state schema specifications identified in step S406; iterating the transformed data over the ordered node hierarchy map to build a semantic event payload; and serializing the semantic event payload.

At step S412, the linked data events and streams processing module 302 streams the set of events over a streaming pipeline. Then, at step S414, the linked data events and streams processing module 302 processes the streamed set of events to generate a linked data media format, and then outputs the linked data media format. In an exemplary embodiment, the processing of the streamed set of events may be implemented by performing the following operations: deserializing the streamed set of events; removing null objects from the streamed set of events; constructing a semantic context that provides a mapping between terms used in the streamed set of events and corresponding definitions; and generating the linked data media format by combining the semantic context with each respective event included in the streamed set of events. In this aspect, the linked data events and streams processing module 302 may also receive another user input in which a media type is specified, and the final operation of combining the semantic context with the events may be performed based on the specified media type.

In an exemplary embodiment, the outputting of the linked data media format may be implemented by storing the linked data media format in a database that is accessible for performing any one or more of the following operations: a data analytics operation, a graph data mining operation, a machine learning operation, and/or a generative artificial intelligence operation.

Data streaming and event-driven architecture (EDA) play crucial roles in modern data processing and application development. Data streaming provides continuous flow of data, while EDA utilizes events to trigger actions based on this data. Together they form the foundation for building reactive and responsive applications that can adapt to real-time changes.

Recently, data streaming has become the standard for complex systems to share data in real time, enabling them to make business decisions quickly. However, when multiple complex systems share data at a high velocity, the consumer of the data is not able to link the different data streams together to form a consolidated coherent view of the data due to lack of semantic meaning behind the data received.

In an exemplary embodiment, a proposed solution addresses these problems by providing the following: 1) a system to generate linked structures for tabular data in an automated fashion; 2) a system to build modern event schema and data streams by implementing linked data concepts; 3) a system to consume modern data streams to build linked data; and 4) a feature ability to produce and consume modern data streams in multiple serializations supporting linked structures based on user input configuration.

In an exemplary embodiment, the proposed solution demonstrates modernizing tabular data, i.e., data organized in rows and columns, into event data streams using modern data processors which are deployed at the publisher and at the consumer side to transmit modern data events and streams and generate linked data in real time.

Figure 5:
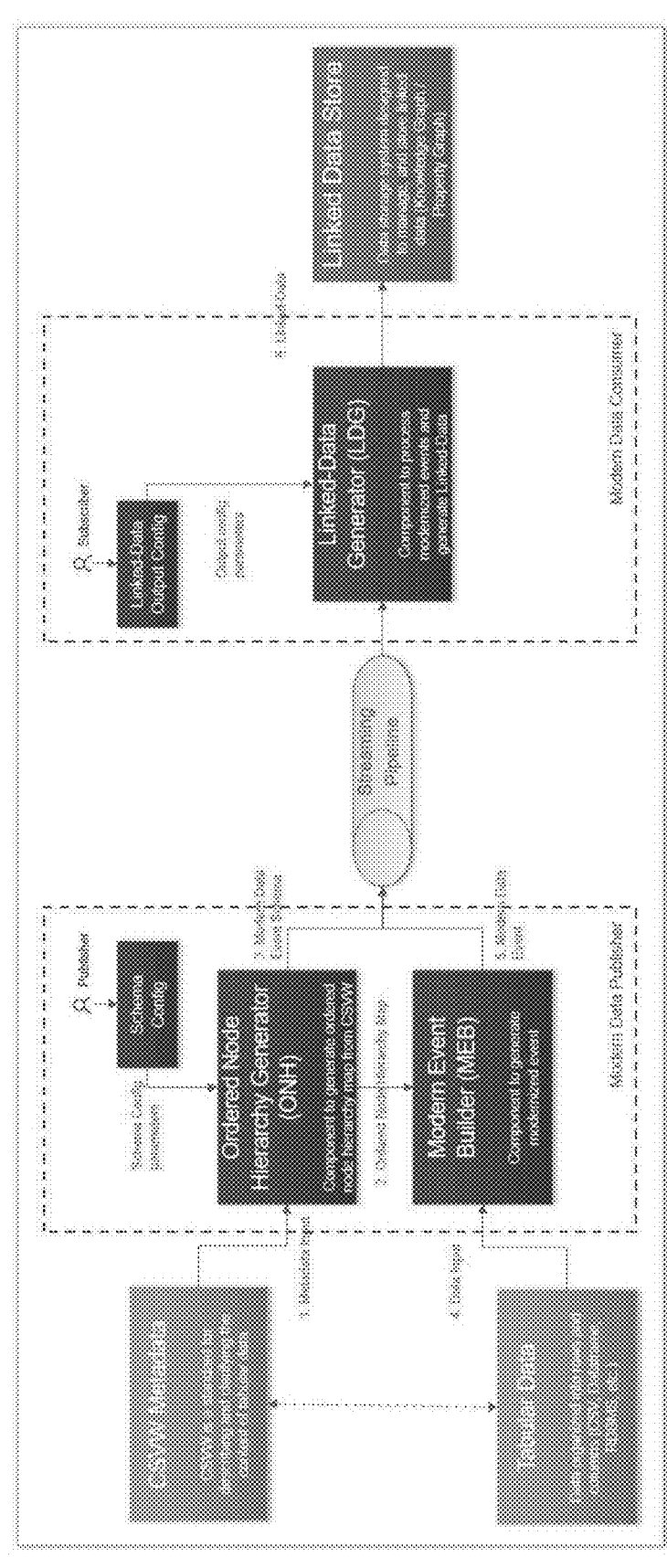
FIG. 5 is a diagram that illustrates a system that implements a method for generating, publishing, processing, and consuming linked data events and streams being shared by complex systems in order to construct a semantic web of the data and thereby form a consolidated coherent view of the data, in accordance with an exemplary embodiment.

FIG. 5 is a diagram 500 that illustrates a system that implements a method for generating, publishing, processing, and consuming linked data events and streams being shared by complex systems in order to construct a semantic web of the data and thereby form a consolidated coherent view of the data, in accordance with an exemplary embodiment. As illustrated in FIG. 5, in an exemplary embodiment, the proposed solution includes each of the following components: 1) Ordered Node Hierarchy Generator: A module that processes a well-designed CSVW to generate an ordered node hierarchy map and modern data event schema. 2) Modern Event Builder: A module that iteratively processes tabular data over the ordered node hierarchy map to generate modernized events and then serialize and publish the events over a streaming pipeline. 3) Linked Data Generator: A module to consume and process the streamed modern events to produce linked data media formats. The Modern Event Builder and Linked Data Generator respectively function as the publisher and consumer, and can work with any data streaming technology. 4) A streaming pipeline, which continuously receives modern events as they are published, making the data promptly accessible for the Linked Data Generator.

Ordered Node Hierarchy Generator: In an exemplary embodiment, the implementation begins with reading a well-designed CSVW metadata and feeding it to the Ordered Node Hierarchy Generator to generate an ordered node hierarchy map and a modern event schema. The CSVW provides a set of metadata annotations for tabular data which provide information about column datatypes, titles, descriptions, and other properties. The Ordered Node Hierarchy Generator utilizes the following CSVW column annotations to generate linked structures to be leveraged in producing modern events: 1) about URL: the about URL Uniform Resource Indicator (URI) template used to create a URL identifier for each value of cell in this column relative to the row in which it is contained; 2) property URL: the expected property URL URI template used to create a URL identifier for the property of each value of cell in this column relative to the row in which it is contained; 3) value URL: the expected value URL URI template used to create the URL identifier for the value of each cell; 4) name: the name of the column; 5) datatype: the expected datatype for the values of cells in this column; 6) description: a textual or informational annotation associated with a column; 7) required: a Boolean that indicates that values of cells in this column must not be empty; 8) titles: any number of human-readable titles for the column; and 9) virtual: a Boolean that indicates whether the column is a virtual column. Virtual columns are used to extend the source data with additional empty columns to support more advanced conversions; when this annotation is false, the column is a real column, which exists in the source data for the table.

Figure 6:
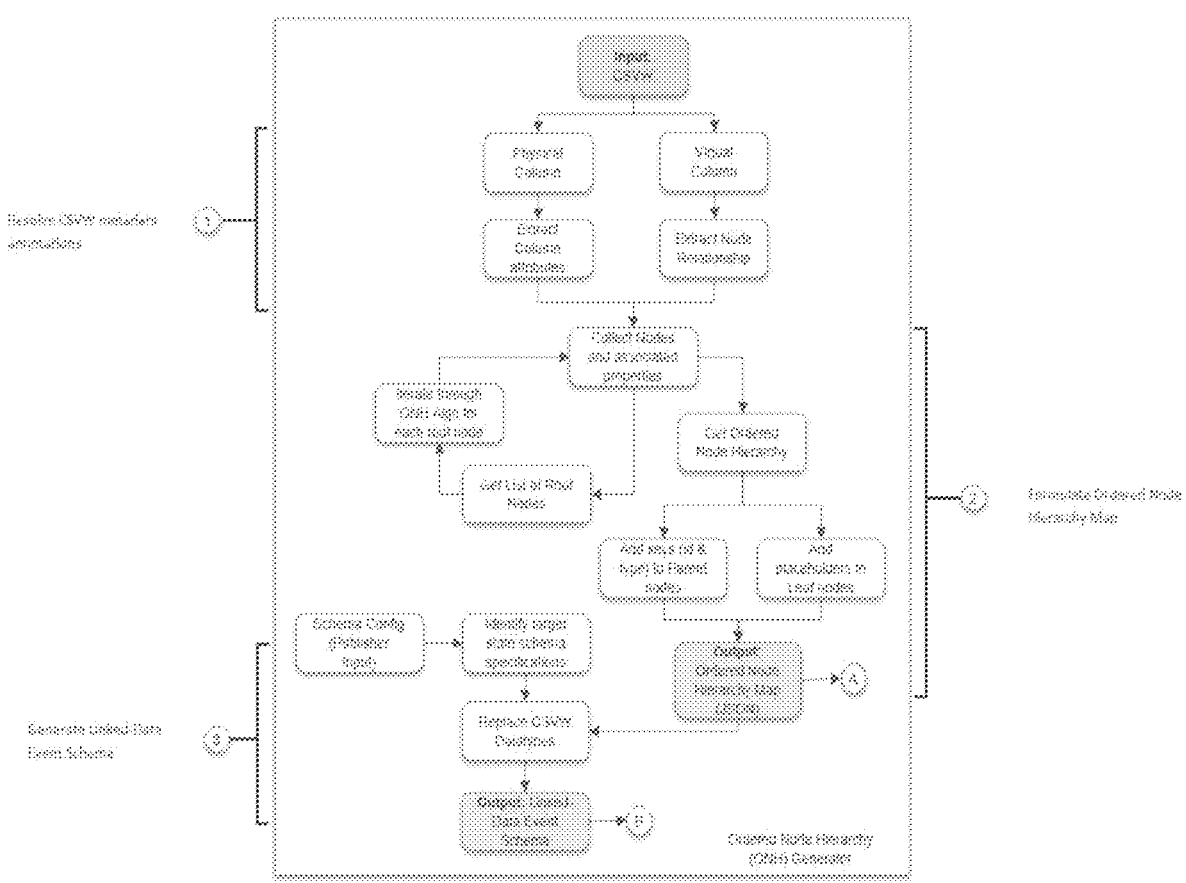
FIG. 6 is a diagram that illustrates an order node hierarchy generator component of a system that implements a method for generating, publishing, processing, and consuming linked data events and streams being shared by complex systems in order to construct a semantic web of the data and thereby form a consolidated coherent view of the data, in accordance with an exemplary embodiment.

FIG. 6 is a diagram 600 that illustrates an ordered node hierarchy generator component of a system that implements a method for generating, publishing, processing, and consuming linked data events and streams being shared by complex systems in order to construct a semantic web of the data and thereby form a consolidated coherent view of the data, in accordance with an exemplary embodiment.

In an exemplary embodiment, as illustrated in FIG. 6, the Ordered Node Hierarchy Generator processes the CSVW metadata input by performing the following steps: 1) Resolve CSVW metadata annotations by performing the following operations: 1a) Distinguish between physical and derived column: CSVW metadata is broken down into physical and derived columns where derived columns offer insights into grouping of multiple physical columns and the interconnections among these groups, forming a map of the tabular dataset. The CSVW column annotation "virtual" helps separate out a derived column from a physical column. 1b) Retrieve and associate attributes with the derived column: "aboutURL", "valueURL" and "propertyURL" are mapped as domain, range and property for a derived column. If range is "type" property, "valueURL" is mapped as class/type for a domain; else "valueURL" is treated as object node range. 1c) Retrieve and associate attributes with physical column: "name", "title", "description" and "datatype" are mapped as column name, alternate name, column description and its datatype, thereby providing column level attributes to a physical column.

2) Formulate ordered node hierarchy map by performing the following operations: 2a) Collect and re-order nodes: Physical and derived column along with associated properties are combined together in a way that each combination of domain class, domain, range, property and datatype is a unique record representing the node-edge-node relationship. Each domain is checked for its existence in range to identify the root domain URI's. The data is further iteratively traversed to re-order all the nodes according to their node levels starting from the root node. 2b) Generate ordered node hierarchy map: The re-ordered node hierarchy is iteratively traversed to formulate an ordered node hierarchy map which represents the nodes as a nested hierarchical JSON structure that mirrors a semantic event schema format.

3) Generate linked-data event schema by performing the following operations: 3a) Identify target state schema specifications: The Ordered Node Hierarchy Generator uses the schema configuration inputs, provided by the user, to formulate the specifications of a modern event schema. In an exemplary embodiment, when Apache Avro is used as a data serialization framework, the proposed solution demonstrates the generation of an Avro schema to support an Avro modern data payload. 3b) Map datatypes and generate modern event schema: To generate an Avro schema, the ordered node hierarchy map undergoes iterative processing to incorporate "name", "namespace", and "fields" into parent nodes. Simultaneously, "datatypes" and "description" are added to leaf nodes, culminating in the generation of a schema for the payload format. CSVW datatypes are mapped to the equivalent datatypes as per the target state technology specifications. For example, if the schema is generated for an Avro payload, an Avro specified datatype must be used in place of an existing CSVW defined datatype, which may typically be expressed by using Extensible Markup Language (XML) Schema Definition (XSD). CSVW (XSD) to Avro datatype compatibility list is exhibited in Table 1 below:

TABLE 1

| XSD | Avro | Avro Datatype Description |
|---|---|---|
| string | string | Represents a Unicode character string. |
| boolean | boolean | Represents a boolean value (true or false). |
| decimal | decimal | Represents arbitrary-precision decimals using a combination of Avro logical types (e.g., {"type": "bytes", "logicalType": "decimal", "precision": <precision>, "scale": <scale>}). |
| integer | int | Represents a 32-bit signed integer. |
| long | long | Represents a 64-bit signed integer. |
| float | float | Represents a 32-bit floating-point number. |
| double | double | Represents a 64-bit floating-point number |
| date | date | Represents a date in the form of days since the Unix epoch (e.g., {"type": "int", "logicalType": "date"}). |
| time | time-millis | Represents time as the number of milliseconds since midnight (e.g., {"type": "int", "logicalType": "time-millis"}). |
| time | time-micros | Represents time as the number of microseconds since midnight (e.g., {"type": "long", "logicalType": "time-micros"}). |
| dateTime | timestamp-millis | Represents a timestamp as the number of milliseconds since the Unix epoch (e.g., {"type": "long", "logicalType": "timestamp-millis"}). |

TABLE 1-continued

| XSD | Avro | Avro Datatype Description |
|---|---|---|
| dateTime | timestamp-micros | Represents a timestamp as the number of microseconds since the Unix epoch (e.g., {"type": "long", "logicalType": "timestamp-micros"}). |

Figure 7:
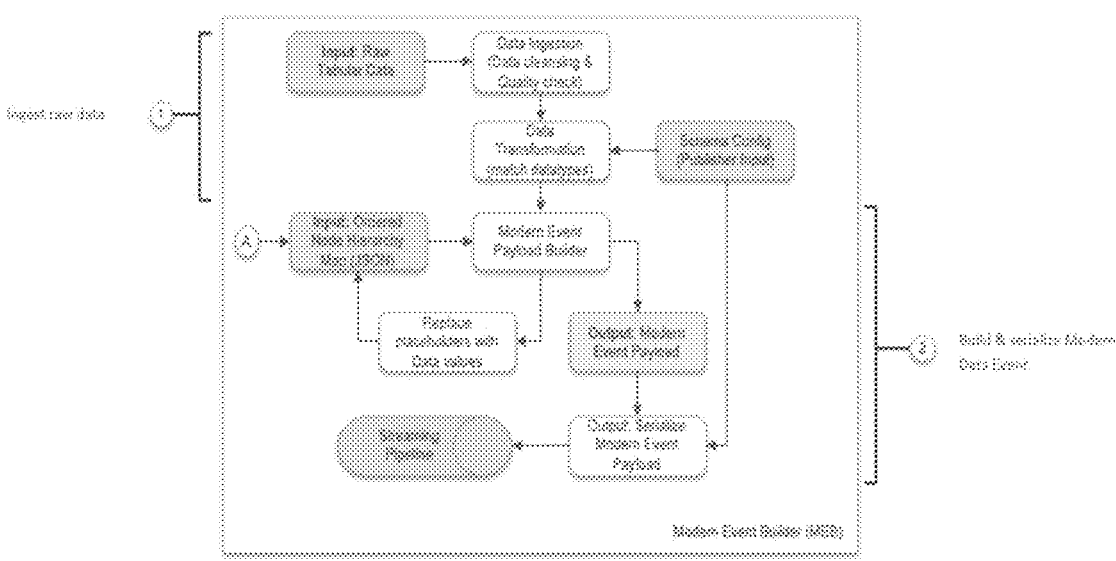
FIG. 7 is a diagram that illustrates a modern event builder component of a system that implements a method for generating, publishing, processing, and consuming linked data events and streams being shared by complex systems in order to construct a semantic web of the data and thereby form a consolidated coherent view of the data, in accordance with an exemplary embodiment.

FIG. 7 is a diagram 700 that illustrates a modern event builder component of a system that implements a method for generating, publishing, processing, and consuming linked data events and streams being shared by complex systems in order to construct a semantic web of the data and thereby form a consolidated coherent view of the data, in accordance with an exemplary embodiment.

Modern Event Builder: In an exemplary embodiment, the Modern Event Builder component reads the raw tabular data and uses the ordered node hierarchy map formulated by the Ordered Node Hierarchy Builder component to process and generate a set of modern events by performing the following steps: 1) Ingest raw data by performing the following operations: 1a) Data pre-processing: The raw tabular data i.e., data organized in rows and columns, undergoes data cleansing and transformation to standardize and normalize the data and ensure consistency. The pre-processed tabular data is passed through various validation modules to ensure quality and integrity of the data. De-duplication tools ensure removal of duplicate records. 1b) Transform data as per datatype specifications: Source data may not always align with the target state schema specifications. User provided schema configurations are used to determine and transform, if required, the pre-processed data to match the datatypes of the generated modern event schema.

2) Build and serialize modern data events by performing the following operations: 2a) Substitute placeholders and generate each modern data event: The ingested data is iterated over the ordered node hierarchy map to build a semantic event payload. In an exemplary embodiment, as also described above, the ordered node hierarchy map is a nested hierarchical JSON structure. Leaf nodes of this JSON structure are key-value pairs where a key represents a physical column from the tabular data and value is the physical column name encapsulated in '$ { }'. These physical column names encapsulated in '$ { }' are used as placeholders within the ordered node hierarchy map and will further undergo a recursive iteration over the cleansed and transformed data to dynamically replace the placeholders with appropriate data values from the dataset. The generated modern data event augments the modern event schema. 2b) Serialize modern event payload as per configuration: The user-provided schema configuration is used to determine serialization format, select and configure stream platform, establish connections, identify topics and implement stream logic to continuously stream the serialized data.

Figure 8:
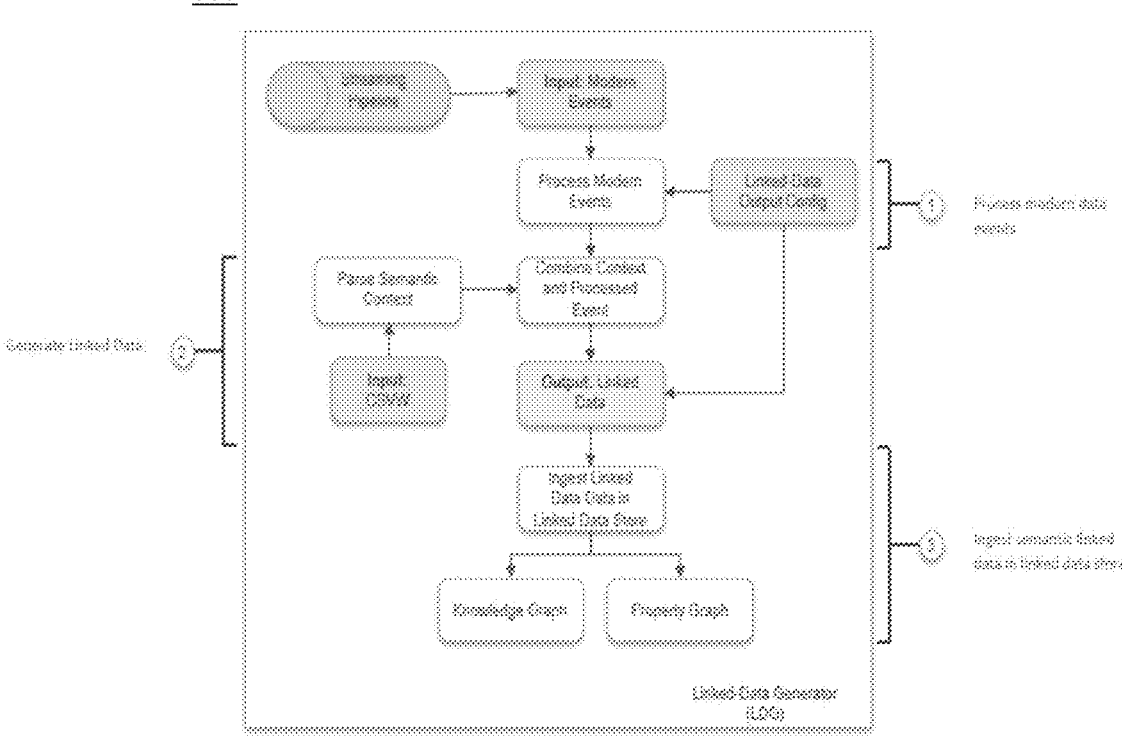
FIG. 8 is a diagram that illustrates a linked data generator component of a system that implements a method for generating, publishing, processing, and consuming linked data events and streams being shared by complex systems in order to construct a semantic web of the data and thereby form a consolidated coherent view of the data, in accordance with an exemplary embodiment.

FIG. 8 is a diagram 800 that illustrates a linked data generator component of a system that implements a method for generating, publishing, processing, and consuming linked data events and streams being shared by complex systems in order to construct a semantic web of the data and thereby form a consolidated coherent view of the data, in accordance with an exemplary embodiment.

Linked Data Generator: In an exemplary embodiment, the modern data events generated by the modern event builder component are streamed in real-time over a streaming pipeline which provides immediate accessibility and responsiveness. The Linked Data Generator component ensures modular consumption of these streamed modern data events to produce desired linked data media types. The sequential steps to be performed in order to consume modern data events include the following: 1) Process modern data events by performing the following operations: 1a) Deserialize modern data events: A user-provided linked-data output configuration is used to determine a deserialization format, establish connection to the relevant topic and read the events. Implement error handling mechanisms to manage issues that may arise during serialization, streaming, or deserialization. 1b) Pre-process deserialized events: Deserialized events are processed further to address missing or null values by removing the null objects within the modern data events. Removing null objects allows for the use of a compact form in order to create a more concise representation. Handling null values consistently helps ensure that different implementations can interpret and process the data in a predictable manner.

2) Generate linked data by performing the following operations: 2a) Parse and build semantic context: A context is a crucial concept that provides a mapping between terms used in modern data event and their definitions or meanings. Context allows for an establishment of a shared understanding of terms, making it possible to represent linked data in a standardized way. In an exemplary embodiment, semantic context is a JSON object that maps terms to Internationalized Resource Identifiers (IRIs), thereby allowing different systems to understand and process the data consistently. The Linked Data Generator component parses the CSVW metadata to build a semantic context that provides a mapping between terms used in semantic event payload and their definitions or meanings. 2b) Build linked data: When required, deserialized pre-processed modern data events further undergo processing to group multiple modern data events as specified in a linked-data output configuration. The linked-data output configuration also provides the media type for the output linked data. Semantic context is further combined with the pre-processed modern events to generate linked data as per desired media type. 3) Linked data storage and usage: The linked data can be ingested into a compatible data store in order to enable advanced data analytics, graph data mining, machine learning, and generative artificial intelligence operations.

Accordingly, with this technology, an optimized process for generating, publishing, processing, and consuming linked data events and streams being shared by complex systems in order to construct a semantic web of the data and thereby form a consolidated coherent view of the data is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for generating a set of linked data events, the method being implemented by at least one processor, the method comprising:

receiving, by the at least one processor, a first set of metadata that relates to a first set of events;

generating, by the at least one processor based on the first set of metadata, an ordered node hierarchy map and a modern data event schema;

receiving, by the at least one processor, a first set of tabular data;

generating, by the at least one processor based on the first set of tabular data and the ordered node hierarchy map, the first set of events;

streaming the first set of events over a streaming pipeline;

processing the streamed first set of events to generate at least one linked data media format; and outputting the at least one linked data media format, wherein the first set of metadata uses a comma-separated values for the web (CSVW) standard that describes a content and a structure of the first set of tabular data, and wherein the ordered node hierarchy map includes information that relates to columns of tables associated with the first set of tabular data, including a first column annotation that relates to an "about" uniform resource locator (URL) identifier, a second column annotation that relates to a "property" URL identifier, a third column annotation that relates to a "value" URL identifier, a fourth column annotation that relates to a column name, a fifth column annotation that relates to a data type, a sixth column annotation that relates to a textual description, a seventh column annotation that relates to an indication as to whether cells in a column are permitted to be empty, and an eighth column annotation that relates to a title.

2. The method of claim 1, wherein the generating of the ordered node hierarchy map comprises:

resolving annotations included in the first set of metadata;

retrieving and associating attributes with the columns;

generating a set of nodes that correspond to respective combinations of domain class, domain, range, property, and datatype;

generating a node order based on node levels with respect to a root node; and using the set of nodes and the node order to generate a nested hierarchical JavaScript Object Notation (JSON) structure having a semantic event schema format.

3. The method of claim 1, wherein the generating of the modern data event schema comprises:

receiving a first user input;

identifying, based on the first user input, a set of target state schema specifications; and using the ordered node hierarchy map and the set of target state schema specifications to map data types associated with the first set of metadata into the modern data event schema.

4. The method of claim 3, wherein the generating of the first set of events comprises:

ingesting the first set of tabular data;

transforming the ingested data based on the set of target state schema specifications;

iterating the transformed data over the ordered node hierarchy map to build a semantic event payload; and serializing the semantic event payload.

5. The method of claim 1, wherein the processing of the streamed set of events to generate at least one linked data media format comprises:

deserializing the streamed first set of events;

removing null objects from the streamed first set of events;

constructing a semantic context that provides a mapping between terms used in the streamed first set of events and corresponding definitions; and generating the at least one linked data media format by combining the semantic context with each respective event included in the streamed first set of events.

6. The method of claim 5, further comprising receiving a second user input that specifies a media type, wherein the generating of the at least one linked data media format comprises combining the semantic context with each respective event based on the specified media type.

7. The method of claim 6, wherein the outputting of the at least one linked data media format comprises storing the at least one linked data media format in a database that is accessible for performing at least one from among a data analytics operation, a graph data mining operation, a machine learning operation, and a generative artificial intelligence operation.

8. A computing apparatus for generating a set of linked data events, the computing apparatus comprising:

a processor;

a memory; and a communication interface coupled to each of the processor and the memory, wherein the processor is configured to:

receive, via the communication interface, a first set of metadata that relates to a first set of events;

generate, based on the first set of metadata, an ordered node hierarchy map and a modern data event schema;

receive, via the communication interface, a first set of tabular data;

generate, based on the first set of tabular data and the ordered node hierarchy map, the first set of events;

stream the first set of events over a streaming pipeline;

process the streamed first set of events to generate at least one linked data media format; and output the at least one linked data media format, wherein the first set of metadata uses a comma-separated values for the web (CSVW) standard that describes a content and a structure of the first set of tabular data, and wherein the ordered node hierarchy map includes information that relates to columns of tables associated with the first set of tabular data, including a first column annotation that relates to an "about" uniform resource locator (URL) identifier, a second column annotation that relates to a "property" URL identifier, a third column annotation that relates to a "value" URL identifier, a fourth column annotation that relates to a column name, a fifth column annotation that relates to a data type, a sixth column annotation that relates to a textual description, a seventh column annotation that relates to an indication as to whether cells in a column are permitted to be empty, and an eighth column annotation that relates to a title.

9. The computing apparatus of claim 8, wherein the processor is further configured to generate the ordered node hierarchy map by:

resolving annotations included in the first set of metadata;

retrieving and associating attributes with the columns;

generating a set of nodes that correspond to respective combinations of domain class, domain, range, property, and datatype;

generating a node order based on node levels with respect to a root node; and using the set of nodes and the node order to generate a nested hierarchical JavaScript Object Notation (JSON) structure having a semantic event schema format.

10. The computing apparatus of claim 8, wherein the processor is further configured to generate the modern data event schema by:

receiving a first user input;

identifying, based on the first user input, a set of target state schema specifications; and using the ordered node hierarchy map and the set of target state schema specifications to map data types associated with the first set of metadata into the modern data event schema.

11. The computing apparatus of claim 10, wherein the processor is further configured to generate the first set of events by:

ingesting the first set of tabular data;

transforming the ingested data based on the set of target state schema specifications;

iterating the transformed data over the ordered node hierarchy map to build a semantic event payload; and serializing the semantic event payload.

12. The computing apparatus of claim 8, wherein the processor is further configured to process the streamed set of events to generate at least one linked data media format by:

deserializing the streamed first set of events;

removing null objects from the streamed first set of events;

constructing a semantic context that provides a mapping between terms used in the streamed first set of events and corresponding definitions; and generating the at least one linked data media format by combining the semantic context with each respective event included in the streamed first set of events.

13. The computing apparatus of claim 12, wherein the processor is further configured to receive a second user input that specifies a media type, and to generate the at least one linked data media format by combining the semantic context with each respective event based on the specified media type.

14. The computing apparatus of claim 13, wherein the processor is further configured to output the at least one linked data media format by storing the linked data media format in a database that is accessible for performing at least one from among a data analytics operation, a graph data mining operation, a machine learning operation, and a generative artificial intelligence operation.

15. A non-transitory computer readable storage medium storing instructions for generating a set of linked data events, the storage medium comprising executable code which, when executed by a processor, causes the processor to:

receive a first set of metadata that relates to a first set of events;

generate, based on the first set of metadata, an ordered node hierarchy map and a modern data event schema;

receive a first set of tabular data;

generate, based on the first set of tabular data and the ordered node hierarchy map, the first set of events;

stream the first set of events over a streaming pipeline;

process the streamed first set of events to generate at least one linked data media format; and output the at least one linked data media format, wherein the first set of metadata uses a comma-separated values for the web (CSVW) standard that describes a content and a structure of the first set of tabular data, and wherein the ordered node hierarchy map includes information that relates to columns of tables associated with the first set of tabular data, including a first column annotation that relates to an "about" uniform resource locator (URL) identifier, a second column annotation that relates to a "property" URL identifier, a third column annotation that relates to a "value" URL identifier, a fourth column annotation that relates to a column name, a fifth column annotation that relates to a data type, a sixth column annotation that relates to a textual description, a seventh column annotation that relates to an indication as to whether cells in a column are permitted to be empty, and an eighth column annotation that relates to a title.

* * * * *